(12) United States Patent
Shin et al.

(10) Patent No.: US 8,102,794 B2
(45) Date of Patent: Jan. 24, 2012

(54) CROSS-LAYER ROUTING METHOD IN WIRELESS SENSOR NETWORK

(75) Inventors: Chang Sub Shin, Daejeon (KR); Bong Soo Kim, Daejeon (KR); Cheol Sig Pyo, Daejeon (KR); Jong Suk Chae, Daejeon (KR); Hyuk Lim, Gwangju (KR); In Hyeok Jang, Gwangju (KR); Hyo Joo Kim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 661 days.

(21) Appl. No.: 12/193,181

(22) Filed: Aug. 18, 2008

(65) Prior Publication Data

US 2009/0147725 A1    Jun. 11, 2009

(30) Foreign Application Priority Data

Dec. 10, 2007   (KR) .................. 10-2007-0127578
Jul. 9, 2008    (KR) .................. 10-2008-0066726

(51) Int. Cl.
  *H04J 1/10* (2006.01)
(52) U.S. Cl. ........................ 370/315; 370/238
(58) Field of Classification Search .......... 370/229–238, 370/226, 243, 492, 501, 246, 315
See application file for complete search history.

(56) References Cited

U.S. PATENT DOCUMENTS

2005/0078672 A1*  4/2005  Caliskan et al. ............. 370/389
2008/0221836 A1*  9/2008  Tateson ........................ 702/188
2008/0248745 A1* 10/2008  Alles et al. ....................... 455/7

FOREIGN PATENT DOCUMENTS

KR    100752929    8/2007

OTHER PUBLICATIONS

Marc Heissenbüttel, "A Novel Position-based and Beacon-less Routing Algorithm for Mobile Ad-Hoc Networks", Institute of Computer Science and Applied Mathmatics, University of Bern, Switzerland, Jul. 2003.
Holger Füβler, "Beaconless Position-Based Routing for Mobile Ad-Hoc Networks", University of Mannheim, republished 2003.
Korean Office Action issued on Dec. 18, 2010 in corresponding Korean Patent Application 10-2008-0066726.
Yao H. Ho et al., "A Connectionless Approach to Mobile Ad Hoc Networks", School of Computer Science, University of Central Florida, pp. 188-195.

* cited by examiner

*Primary Examiner* — Gary Mui
(74) *Attorney, Agent, or Firm* — Staas & Halsey LLP

(57) ABSTRACT

Provided is a cross-layer routing method in a wireless sensor network including: locating a destination node which is a final destination of data by a source node which generates the data; and determining an optimal relay node among one or more neighboring nodes using their position information for each hop and forwarding the data from the source node to the destination node through the determined relay nodes. Therefore, an effective and stable routing which reduces overheads of additional control messages used for stable data forwarding and reduces collisions in a shared channel by using wireless link layer characteristics can be implemented.

5 Claims, 4 Drawing Sheets

S: SENDING NODE
R: RECEIVING NODE
D: DESTINATION NODE
p: PROGRESS

CROSS-LAYER ROUTING METHOD IN WIRELESS SENSOR NETWORK

CROSS-REFERENCE TO RELATED PATENT APPLICATION

This application claims the benefits of Korean Patent Application Nos. 10-2007-0127578 and 10-2008-0066726, respectively filed on Dec. 10, 2007 and Jul. 9, 2008, in the Korean Intellectual Property Office, the disclosures of which are incorporated herein by reference.

BACKGROUND OF THE INVENTION

1. Field of the Invention

The present invention relates to an effective and stable routing method significantly reducing overheads of advance information exchange messages which causes degradation in performance of a wireless sensor network in consideration of wireless link characteristics in a wireless sensor network environment.

The present invention is derived from a research project supported by the Information Technology (IT) Research & Development (R&D) program of the Ministry of Information and Communication (MIC) and the Institute for Information Technology Advancement (IITA) [2005-S-038-03, Development of UHF RF-ID and Ubiquitous Networking Technology]

2. Description of the Related Art

A wireless sensor network is a core technology of a ubiquitous network that has been rapidly developed lately and used in various application fields such as environment monitoring, highway traffic information management, building monitoring, and the like. The wireless sensor network consists of sensor nodes each of which is equipped with a sensor module and a network module. In the wireless sensor network, a number of sensor nodes are positioned at target areas and organically operates to form a network.

In the wireless sensor network environment, a number of wireless sensor nodes are connected in an ad-hoc scheme to form a network and cooperatively operate. A main object of the wireless sensor network is to measure an object or a phenomenon to be observed by a sensor to generate information and transmit the generated information to a predetermined destination. In order to efficiently transmit the information to the destination, a routing scheme is needed. In an existing routing scheme, a method of setting a path between the distributed sensors and transmitting the generated information through the path is used to transmit the generated information to the destination. In order to use the method, network configuration information is required. In an environment in which changes in topology frequently occur such as in the wireless sensor network having nodes with mobility, a large amount of energy is consumed to maintain the network configuration information and large transmission delays may occur. Therefore, a geographical routing method using position information of each node is required to reduce overheads of exchanging network information.

SUMMARY OF THE INVENTION

The present invention provides an algorithm providing stable routing optimized in a communications environment that is not stable due to mobility of nodes in a wireless ad-hoc network, and a method improving the total network performance in a wireless sensor network environment.

According to an aspect of the present invention, there is provided a cross-layer routing method in a wireless sensor network including: locating a destination node which is a final destination of data by a source node which generates the data; and determining an optimal relay node among one or more neighboring nodes using their position information for each hop and forwarding the data from the source node to the destination node through the determined relay nodes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
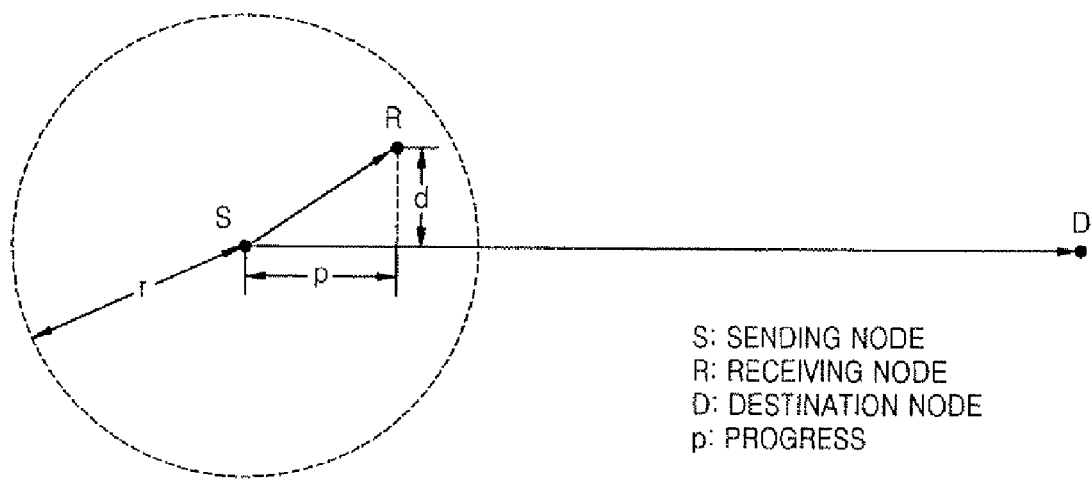
FIG. 1 is a view for explaining a definition of a progress used according to the present invention.
Figure 2:
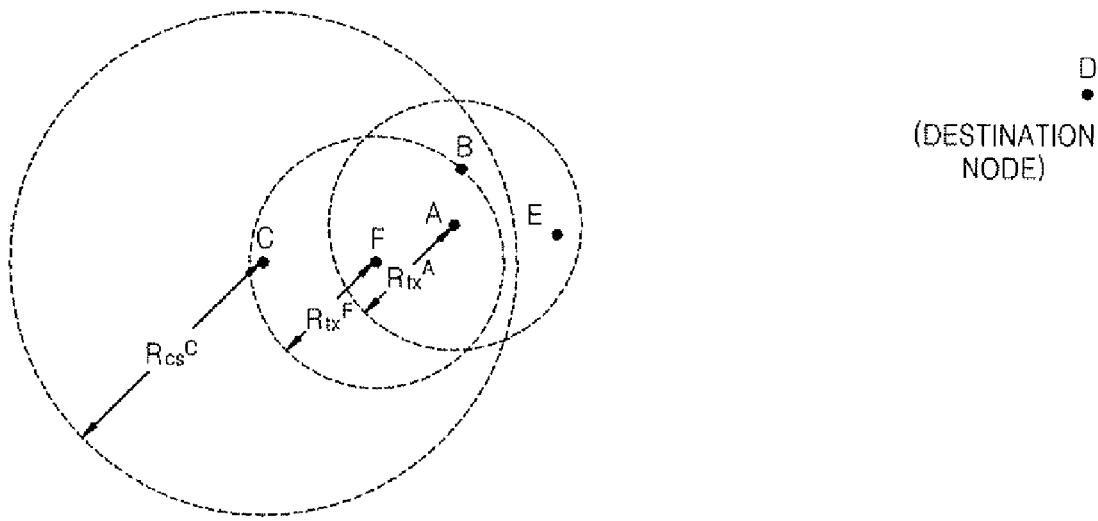
FIG. 2 is a view illustrating a node configuration for explaining a cross-layer routing method in a wireless sensor network according to the present invention.
Figure 3:
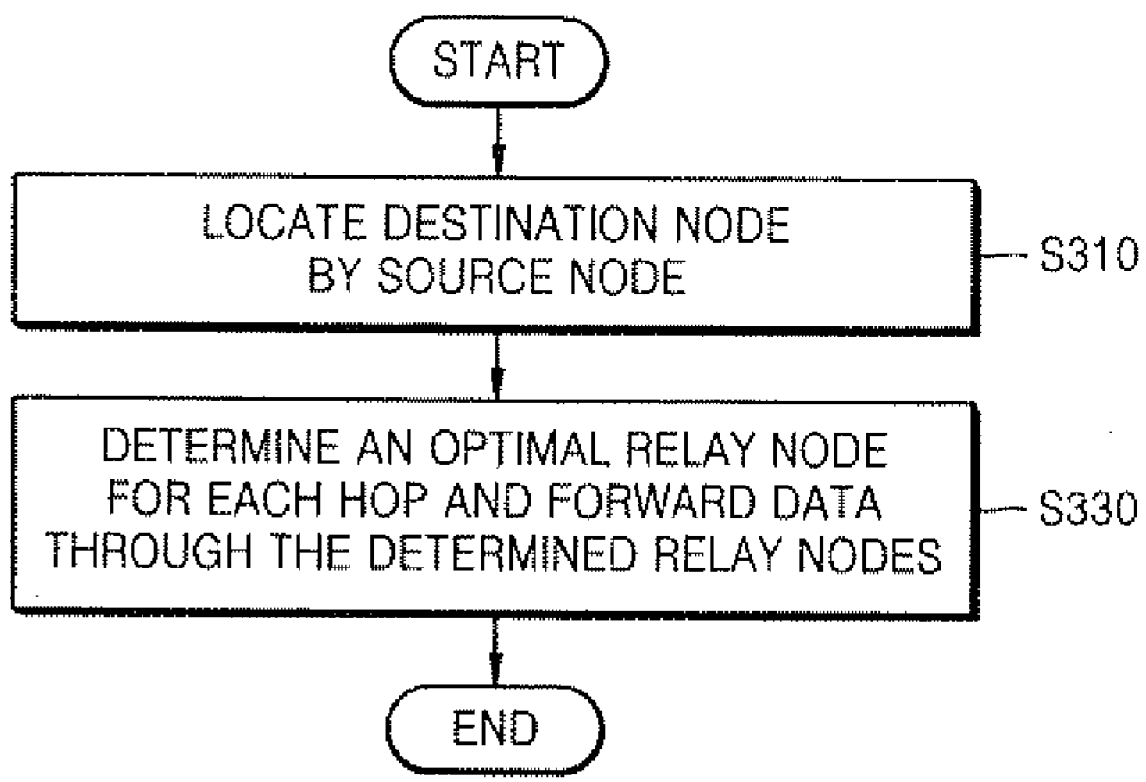
FIG. 3 is a flowchart of the cross-layer routing method in the wireless sensor network according to the present invention.
Figure 4:
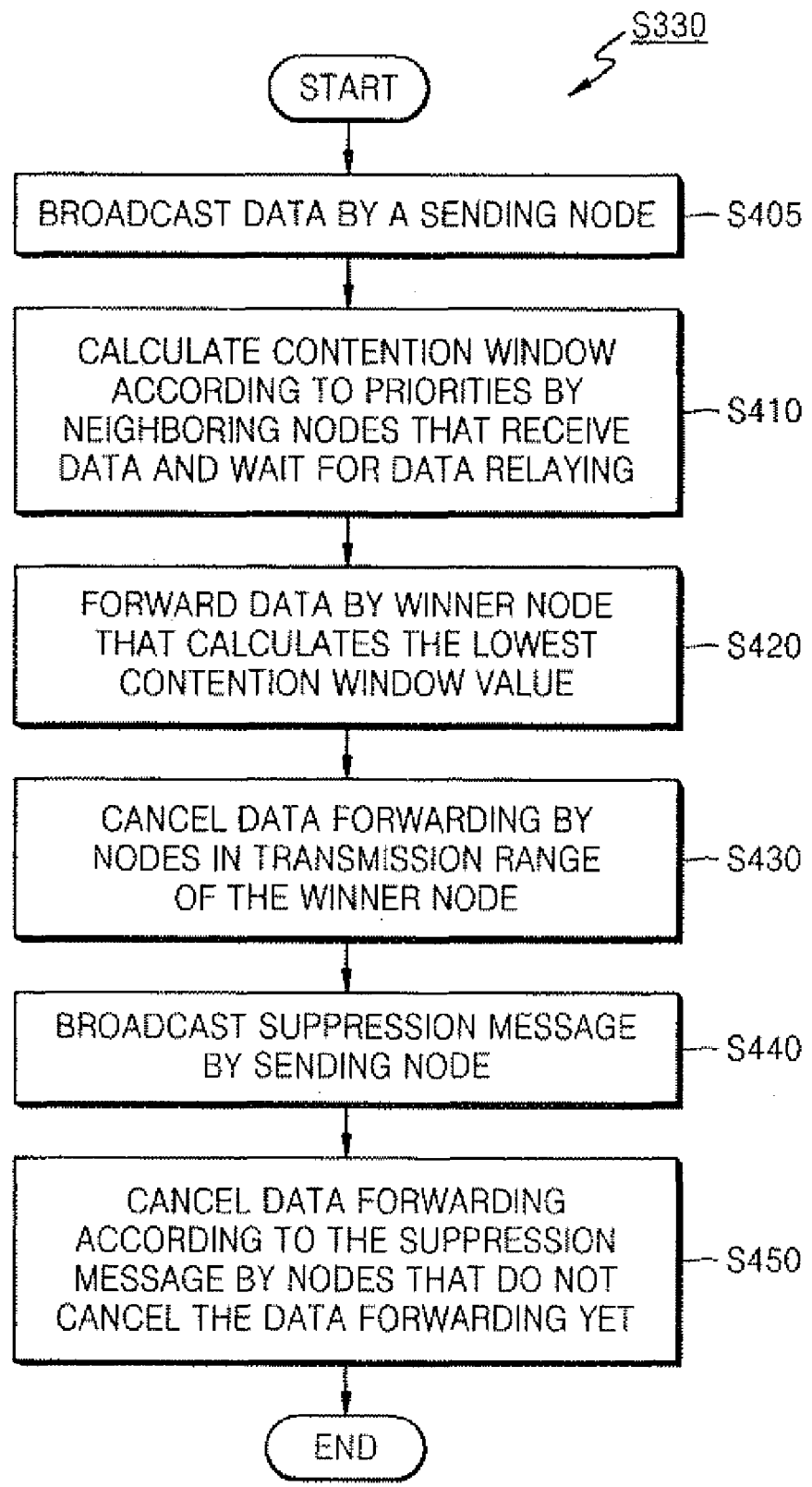
FIG. 4 is a flowchart illustrating a detailed process of forwarding data (step S330) illustrated in FIG. 3.
Figure 5:
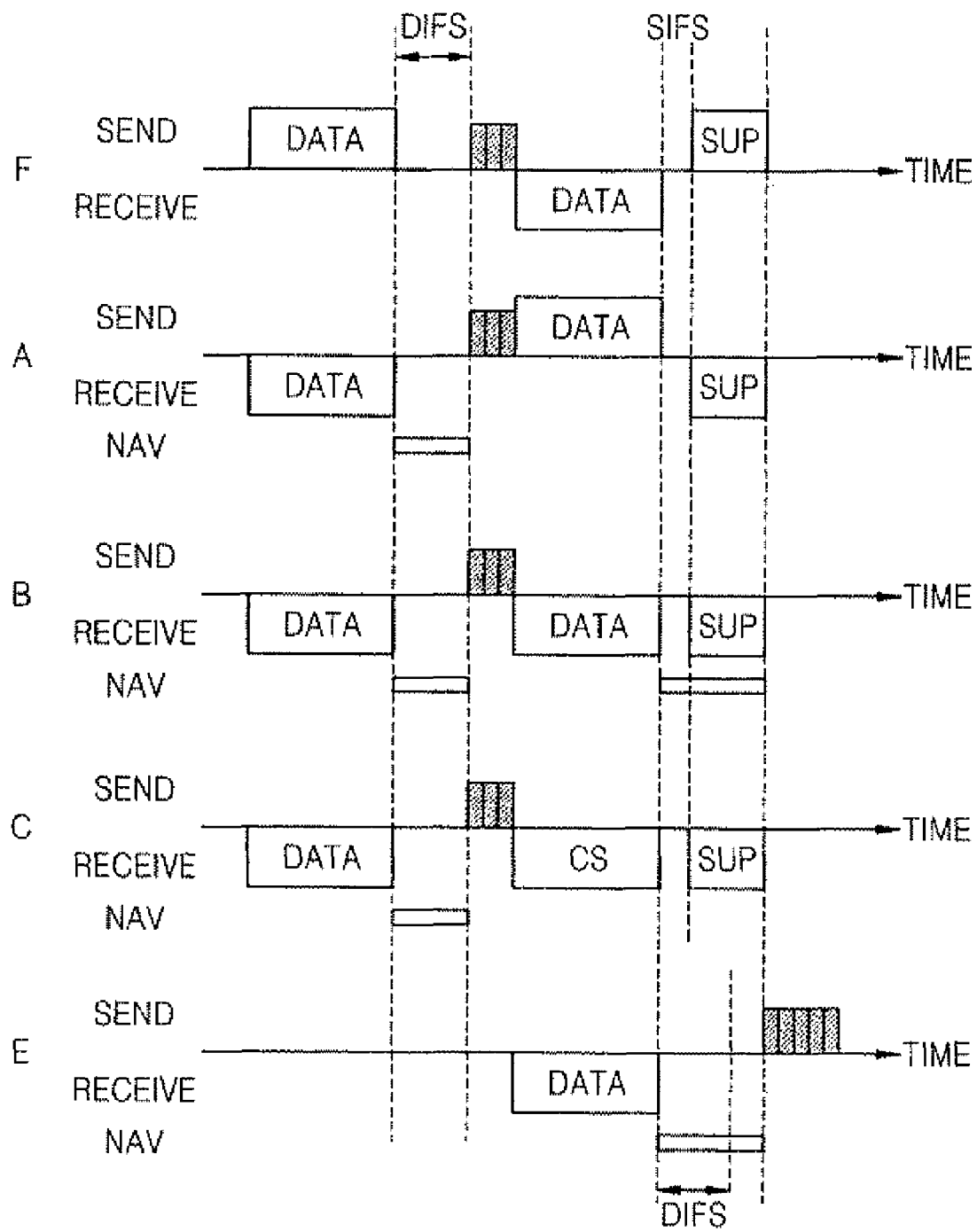
FIG. 5 is a timing diagram for explaining the cross-layer routing method in the wireless sensor network according to the present invention.

Hereinafter, exemplary embodiments of the present invention will be described in detail with reference to the attached drawings. A description of technologies that can be easily understood by those of ordinary skill in the art is omitted. FIG. 1 is a view for explaining a definition of a progress used according to the present invention. FIG. 2 is a view illustrating a node configuration for explaining a cross-layer routing method in a wireless sensor network according to the present invention. FIG. 3 is a flowchart of the cross-layer routing method in the wireless sensor network according to the present invention. FIG. 4 is a flowchart illustrating a detailed process of forwarding data (step S330) illustrated in FIG. 3. FIG. 5 is a timing diagram for explaining the cross-layer routing method in the wireless sensor network according to the present invention.

First, terms used in the present invention are defined. A source node is a node which generates data and transmits the data to a destination node. A destination node is a final destination node to which the source node is to transmit the data. A relay node is a node which relays the data through a multi-hop transmission so that the data can be forwarded to the destination node when the destination node is outside a transmission range of the source node. A sending node is a node which transmits the data in one hop transmission. A receiving node is a node which receives the data in one hop transmission. A next relay node is a node which starts relaying first among nodes that listen to the data from the relay node. A progress is a distance obtained by protecting a distance connecting the sending node to the receiving node onto a straight line connecting the sending node to the destination node. In FIG. 1, the progress is illustrated. Here, S denotes the sending node, D denotes the destination node, R denotes the receiving node, r denotes a transmission range of the sending node S, and p denotes the progress of the receiving node R.

Now referring to FIG. 3, an exemplary embodiment of a cross-layer routing method in a wireless sensor network according to the present invention is described. Each node in the wireless sensor network applies positioning information to locate its position. For example, each node uses a technique of locating a position and obtaining virtual coordinates by using positioning services applying additional hardware such as a global positioning system (GPS) and Galileo, or by using a radio frequency (RF) of the wireless sensor network. By using the aforementioned information, data routing comprises, (a) locating a destination node (step S310), and (b) determining an optimal relay node among one or more neighboring nodes using their position information for each hop and forwarding data through the determined relay nodes (step S330), In the step (a), the source node broadcasts a destination node discovery message including coordinates of the source node, an identification number of the source node, an identification number of the destination node, and a message identification number. Other nodes broadcast the message sequentially, and when the destination node receives the message, the destination node transmits a reply message including coordinates of the destination node to the source node. For the destination node discovery, a mobile ad-hoc network (MANet) routing algorithm such as dynamic source routing (DSR) or ad-hoc on-demand distance vector (AODV) routing may be used.

In the step (b), the source node transmits a data packet including the identification number of the source node, the coordinates of the source node, the identification number of the destination node, the coordinates of the destination node, and the message identification number through the relay nodes to the destination node in a forwarding scheme according to the present invention (step S330). This step is described in detail with reference to FIG. 4. (1) The sending node broadcasts data including the identification number of the source node, the coordinates of the source node, the identification number of the sending node, the coordinates of the sending node, the identification number of the destination node, the coordinates of the destination node, and the message identification number (step S405). (2) Each of neighboring nodes in a transmission range of the sending node listens to the broadcast data, calculates its contention window according to a priority, and waits for data relaying (step S410). (3) A contention-winner node that calculates the lowest contention window value forwards the data first through broadcasting (step 420). (4) Nodes in a transmission range of the winner node in (3) among the waiting nodes in (2) cancel data forwarding after listening to the broadcasting of the winner node (step S430). (5) The sending node broadcasts a suppression message to the neighboring nodes after listening to the data broadcasting in (3) so that the neighboring nodes cancel the forwarding (step S440). (6) Nodes that do not cancel the forwarding yet in (4) among the waiting nodes in (2) cancel the data forwarding after listening to the suppression message in (5) (step S450).

Referring to FIG. 1, for an algorithm for calculating a contention window (CW) by each node so that a node at an optimal position among the nodes that listen to the broadcasting in (2) can forward the packet, (i) a progress p obtained by projecting a distance between the sending node and the receiving node onto a straight line connecting the sending node to the destination node and (ii) the least distance d between the receiving node R and the straight line SD connecting the sending node S to the destination node D are considered. Here, a CW value of the receiving node R is calculated by using Equation 1 in consideration of the maximum contention window value of the receiving node $CW_{max}$, the transmission range of the sending node r, the progress p of (i), and the least distance d of (ii) representing how close to the straight line SD connecting the sending node to the destination node the receiving node is.

$$CW_R(r, d, p) = \left\{\left(\frac{r-p}{r}\right) + \left(\frac{d}{r}\right)\right\} \times (CW_{max}) \times \frac{1}{3} \quad \text{[Equation 1]}$$

A contention window value $CW_R$ of a receiving node which is obtained by multiplying a maximum contention window value $CW_{max}$ by a coefficient $$\left\{\left(\frac{r-p}{r}\right) + \left(\frac{d}{r}\right)\right\} \times \frac{1}{3}$$

that is less than 1 is less than the maximum contention window value $CW_{max}$. Since the coefficient $$\left\{\left(\frac{r-p}{r}\right) + \left(\frac{d}{r}\right)\right\} \times \frac{1}{3}$$

decreases as a progress p, which is obtained by projecting a distance between a sending node and a receiving node onto a straight line connecting the sending node to a destination node, increases, a node that is closer to the destination node has a lower contention window value $CW_R$ and thus has a higher priority. If only the progress p is considered in calculating the contention window value $CW_R$, since a receiving node that is farther away from a straight line SD, which is the least path from the sending node to the destination node, but has a higher progress p may have a higher priority over a receiving node that is closer to the straight line SD, an optimal contention window value $CW_{max}$ should be determined by considering the least distance d between the receiving node and the straight line SD as well as the progress p. Since the coefficient $$\left\{\left(\frac{r-p}{r}\right) + \left(\frac{d}{r}\right)\right\} \times \frac{1}{3}$$

increases as the distance d increases, a node that is farther away from the straight line SD has a higher contention window value $CW_{max}$ and thus has a lower priority. Accordingly, an optimal node that is close to the least path from the sending node to the destination node and also has a high progress becomes a winner node and relays data. Also, since a maximum value of $$\left\{\left(\frac{r-p}{r}\right) + \left(\frac{d}{r}\right)\right\}$$

is $(1+\sqrt{2})$, that is approximately 2.414, the contention window value $CW_R$ obtained by multiplying $$\left\{\left(\frac{r-p}{r}\right) + \left(\frac{d}{r}\right)\right\},$$

$CW_{max}$ and $\frac{1}{3}$ is less than the maximum contention value $CW_{max}$.

In addition, in order for only the winner node at the optimal position to transmit data during the forwarding, following techniques are used. First, in the (4), the nodes in the transmission range of the winner node that forwards data first receive the same forwarding data as its data to be forwarded, from the winner node before transmitting the data to be forwarded, so that the nodes cancel the forwarding. Next, in the (5), nodes that listened to the data relaying from the sending node but are outside the transmission range of the winner node cancel the data forwarding after listening to the suppression message transmitted from the sending node. For this, it is assumed that the transmission ranges of all nodes are equal and carrier sense ranges are equal, and the carrier sense range is twice the transmission range. Since the winner node is inside the carrier sense range of the nodes, the nodes cannot perform the data forwarding until the winner node completes the data forwarding. After the winner node completes the forwarding, the nodes start contending according to backoff counter values after waiting for a distributed interframe space (DIFS) and the sending node broadcasts the suppression message after waiting for a short interframe space (SIFS), so that the suppression message can be transmitted to the nodes that wait for relaying before contention of the nodes.

FIG. 2 is a view for explaining the forwarding technique according to the present invention Here, F denotes the relay node, and D denotes the destination node Nodes located between node E and the destination node D are omitted in the figure. $R_{tx}^F$ denotes a transmission range of the relay node F, $R_{tx}^A$ denotes a transmission range of node A, and $R_{cs}^C$ denotes a carrier sense range of node C. FIG. 5 is a timing diagram for explaining the following description.

First, (a) when the sending node F broadcasts data for forwarding, the nodes A, B, and C in the transmission range of the node F listen to the data. (b) After the nodes A, B, and C receive the data, the nodes A, B, and C wait for the DIFS and start contending on the basis of contention windows. Here, the contention window (CW) is determined in consideration of the aforementioned (i) and (ii) so that an optimal node has the smallest contention window value and transmits the data first. The determined CW value is used as follows. Each of the nodes that starts contending randomly selects an integer b that is a backoff counter in a range of [0,CW] and tries to transmit the data in a b-th effective slot. In the above example, when the nodes A, B, and C have b values as 3, 5, and 15, respectively, (c) the node A finishes receiving the data from the node F, waits for the DIFS, waits for a third time slot, and starts data forwarding. A receiver sets a network allocation vector (NAV) corresponding to the data forwarding, a SIFS, and a transmission time of the suppression message, so that a collision between the data relay of the next relay node E and the suppression message of the node F can be prevented. (d) The node B decreases the backoff counter by 1 per slot in order to wait for a fifth slot time, and when the node A starts forwarding first after a third slot time, the node B receives the data. Since the data to be forwarded by the node B is forwarded by the node A first, the node B cancels its forwarding. (e) The node F that perceives that the node A forwards the data waits for the SIFS after the node A finishes forwarding, and broadcasts a suppression message to prevent other nodes from performing forwarding. The suppression message from the node F has to arrive before the nodes that wait for data forwarding start forwarding, so that the node F broadcasts the suppression message after waiting for the SIFS. (f) The node C decreases the backoff counter by 1 per slot in order to wait for a fifteenth slot time. After the third slot time, since the node A is inside the carrier sense range, the node C detects forwarding of the node A and cannot have an effective slot time. Thereafter, the node C waits until the node A finishes forwarding. After the node A finishes forwarding, the node C waits for the DIFS and remaining twelve slot times in order to forward the data. However, the node C receives the suppression message from the node F before forwarding, and the node C cancels the data forwarding.

Accordingly, when the aforementioned routing method is applied, a relay node can forward data to a next relay node right after receiving data without a transmission/reception process of an advance control message. Therefore, effective and fast data forwarding is possible. In addition, on the basis of a receiver-based geographical routing method, stable routing in a wireless network environment in which changes in topology frequently occur can be implemented.

The present invention provides an effective and stable routing method reducing overheads of additional control messages used for stable data forwarding and reducing collisions in a shared channel, by using wireless link layer characteristics. Therefore, even when the packet relay is failed, in a wireless sensor network having high overheads of packet-retransmission caused by a low data rate and a multi-hop transmission, a performance improvement such as an increase in a total network throughput can be achieved. In addition, even in an asynchronous network having a sleep time that is not synchronized between nodes, the method can be used.

The wireless routing method according to the present invention is based on a receiver-based method. In a receiver-based routing method, a distributed algorithm in which wireless nodes operate cooperatively and opportunistically is used. Therefore, an appearance or a movement of a new node or exhausting of an existing node life can be easily managed. Specifically, when a sender transmits a packet through a wireless link, there are a number of receivers that can listen to the transmission signal from the sender. Therefore, by applying a diversity, a performance of a multi-hop wireless network can be significantly improved.

Therefore, the present invention relates to a routing method in a wireless sensor network, and more particularly, to a method of implementing reliable routing without exchanging network topology information by using characteristics of a wireless link layer. Therefore, on the basis of lower layer information on network layers, overheads of advance information exchange messages can be reduced in routing, and by providing an effective and stable routing algorithm, a performance of a wireless sensor network can be improved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A cross-layer routing method in a wireless sensor network comprising:
  locating a destination node which is a final destination of data by a source node which generates the data; and
  determining an optimal relay node among one or more neighboring nodes using their position information for each hop and forwarding the data from the source node to the destination node through the determined relay nodes,
  wherein determining an optimal relay node and forwarding the data comprises:
  broadcasting data by a sending node;
  forwarding the data through broadcasting first by a node determined as a winner node from among neighboring nodes that receive the broadcasting of the sending node;
  canceling data forwarding by nodes in a transmission range of the winner node after receiving the broadcasting of the winner node; and
  canceling data forwarding of the neighboring nodes that do not cancel data forwarding, by the sending node after receiving the broadcasting of the winner node,
  wherein forwarding the data through broadcasting first by a node determined as a winner node comprises:
  waiting for data relaying by calculating contention windows according to priorities by the neighboring nodes; and
  forwarding data through broadcasting first by a winner node that calculates the lowest contention window among the neighboring nodes, and
  wherein the contention window value includes a progress obtained by projecting a distance between the sending node and a receiving node onto a straight line connecting the sending node to the destination node, the least distance between the receiving node and the straight line connecting the sending node to the destination node, a transmission range of the sending node, and the maximum contention window value of the receiving node.

2. The method of claim 1, wherein the data includes an identification number and coordinates of the source node, an identification number and coordinates of the sending node, an identification number and coordinates of the destination node, and an message identification number of the data.

3. The method of claim 1, wherein canceling data forwarding of the neighboring nodes that do not cancel data forwarding comprises:
  broadcasting a suppression message for canceling data forwarding of the neighboring nodes by the sending node after receiving the broadcasting of the winner node; and
  canceling data forwarding by neighboring nodes that do not cancel data, among the neighboring nodes that wait for data relaying, after receiving the suppression message.

4. The method of claim 1, wherein the contention window value CWF(r,d,p) is obtained by an equation $$CW_R(r, d, p) = \left\{\left(\frac{r-p}{r}\right) + \left(\frac{d}{r}\right)\right\} \times (CW_{max}) \times \frac{1}{3},$$

where p denotes the progress obtained by projecting the distance between the sending node and the receiving node onto the straight line connecting the sending node to the destination node, d denotes the least distance between the receiving node and the straight line connecting the sending node to the destination node, r denotes the transmission range of the sending node, and $CW_{max}$ denotes the maximum contention window value of the receiving node.

5. The method of claim 1, wherein canceling data forwarding of the neighboring nodes that do not cancel data forwarding comprises:
  waiting for a distributed interframe space (DIFS) before data forwarding by a node that is outside the transmission range of the winner node and receives data broadcasting from the sending node; and
  after the winner node completes the data forwarding, broadcasting a suppression message by the sending node after waiting for a short interframe space (SIFS).

* * * * *